US011032627B2

(12) United States Patent
Uchida et al.

(10) Patent No.: US 11,032,627 B2
(45) Date of Patent: Jun. 8, 2021

(54) MAINTENANCE DEVICE, PRESENTATION SYSTEM, AND PROGRAM

(71) Applicant: Hitachi, Ltd., Tokyo (JP)

(72) Inventors: Takayuki Uchida, Tokyo (JP); Toshiaki Kono, Tokyo (JP); Hideaki Suzuki, Tokyo (JP); Takahiro Fujishiro, Tokyo (JP)

(73) Assignee: HITACHI, LTD., Tokyo (JP)

( * ) Notice: Subject to any disclaimer, the term of this patent is extended or adjusted under 35 U.S.C. 154(b) by 615 days.

(21) Appl. No.: 15/875,299

(22) Filed: Jan. 19, 2018

(65) Prior Publication Data
US 2018/0234746 A1    Aug. 16, 2018

(30) Foreign Application Priority Data

Feb. 15, 2017   (JP) .............................. JP2017-025531

(51) Int. Cl.
*H04Q 9/00* (2006.01)
*G08B 21/18* (2006.01)

(52) U.S. Cl.
CPC ............. *H04Q 9/00* (2013.01); *G08B 21/182* (2013.01); *G08B 21/187* (2013.01); *H04Q 2209/823* (2013.01)

(58) Field of Classification Search
CPC .. H04Q 9/00; H04Q 2209/823; G08B 21/182; G08B 21/187; G08B 29/02
See application file for complete search history.

(56) References Cited

U.S. PATENT DOCUMENTS

| | | | | |
|---|---|---|---|---|
| 2011/0264424 | A1* | 10/2011 | Miwa | G05B 23/0278 703/2 |
| 2014/0351149 | A1* | 11/2014 | Minegishi | G06Q 10/20 705/305 |
| 2016/0378584 | A1* | 12/2016 | Oku | G06F 11/079 358/1.14 |

FOREIGN PATENT DOCUMENTS

JP    2010-225006 A    10/2010

* cited by examiner

*Primary Examiner* — Regis J Betsch
*Assistant Examiner* — Jeremy A Delozier
(74) *Attorney, Agent, or Firm* — Mattingly & Malur, PC

(57) ABSTRACT

Sensor data immediately after the issuance of an alarm does not exhibit the peculiarity of a failure, with the result that the wrong component is sometimes erroneously identified as the failure component. A failure component identification unit provided in a maintenance device collects an alarm issued when a measurement value exceeds a range of a measurement threshold value in an apparatus being a maintenance target. The failure component identification unit identifies the failure component on the basis of the measurement value exhibiting a condition indicating a peculiarity of the failure. An identification reliability determination unit determines the reliability of the component identification result obtained by a failure component identification unit. When it is determined that the reliability of the identification result is low, a presentation unit presents measures to enhance the reliability of the identification result until the measurement value exhibits a condition indicating the peculiarity of the failure.

7 Claims, 9 Drawing Sheets

MAINTENANCE DEVICE, PRESENTATION SYSTEM, AND PROGRAM

BACKGROUND OF THE INVENTION

1. Field of the Invention

The present invention relates to a maintenance device, a presentation system, and a program.

2. Description of the Related Art

To constantly operate an apparatus such as a gas engine, an elevator, or a mining/building apparatus, a maintenance operation of the apparatus is indispensable. In a conventional effective technique for the maintenance operation, a maintenance device collects, for example, sensor data such as temperature, pressure, or electric current measured by a sensor mounted to a component of the apparatus, and conducts abnormality diagnosis based on the sensor data, whereby the cause of the abnormality is analyzed. When the apparatus is out of order, an alarm is issued from the apparatus. Thus, there is known a technique according to which the maintenance device identifies the component out of order based on the alarm and sensor data transmitted immediately after the failure of the apparatus, providing the user with information for replacing the component.

JP-2010-225006-A discloses a technique according to which, in order to locate the failure component, the operation times of the components up to now are stored. When the performance of a component markedly deteriorates with taking account of the operation time, it is determined that its service life has expired, and the operator is urged to replace the component.

SUMMARY OF THE INVENTION

When, however, the technique disclosed in JP-2010-225006-A is employed, it can happen that the wrong component is erroneously located as the failure component from the pressure and temperature of a tank immediately after the failure and from sensor data on the electric current value of an electric circuit. For example, depending on the specifications of the apparatus or component, the condition before the failure still remains immediately after the failure, with no peculiarity of the failure being reflected in the sensor data. Suppose, for example, the apparatus is a pump. The condition before the failure is a physical amount such as the amount of water remaining in the piping and the motor temperature. In the case of an electric circuit, it is the amount of electric charge remaining in a capacitor. If the condition before the failure remains in the apparatus, it is impossible to accurately grasp the change in the condition of the apparatus due to the failure. Further, when an apparatus suffers failure, and the normal condition remains in the sensor data immediately after the issuance of the alarm, it may occur that the peculiarity of the failure component does not appear in the waveform of the sensor data. Thus, an unskilled serviceman may erroneously identify the wrong component as the failure component from the waveform of the sensor data.

The present invention has been made in view of the above circumstances. It is an object of the present invention to make it possible to correctly identify a failure component.

In accordance with the present invention, there is provided a maintenance device including: a failure component identification unit that collects an alarm issued when a measurement value, which is obtained by a measurement unit installed in an apparatus being a maintenance target, the measuring unit measuring a condition of a component constituting the apparatus, exceeds a range of a measurement threshold value upon the component being out of order and that collects the measurement value transmitted with the alarm from the apparatus, the failure component identification unit identifying the failure component on the basis of the measurement value exhibiting a condition indicating a peculiarity of the failure after the failure of the component; an identification reliability determination unit that determines a reliability of the failure component identification result obtained by the failure component identification unit; and a presentation unit that, when it is determined by the identification reliability determination unit that the reliability of the identification result is low, presents measures to enhance the reliability of the identification result until the measurement value exhibits a condition indicating the peculiarity of the failure.

According to the present invention, measures to enhance the reliability of the identification result are presented, and the measures are taken for the apparatus, for example, by the apparatus user, with the result that the maintenance device can correctly identify the failure component based on the measurement value indicating the condition exhibiting the peculiarity of the failure after the failure of the component.

Other problems, constructions, and effects will become apparent from the following description of an embodiment.

BRIEF DESCRIPTION OF THE DRAWINGS

FIG. 11A shows an example of the information presented to the apparatus user by the action presentation unit, and FIG. 11B shows an example of the information presented to the serviceman by the presentation unit.

DESCRIPTION OF THE PREFERRED EMBODIMENTS

Figure 1:
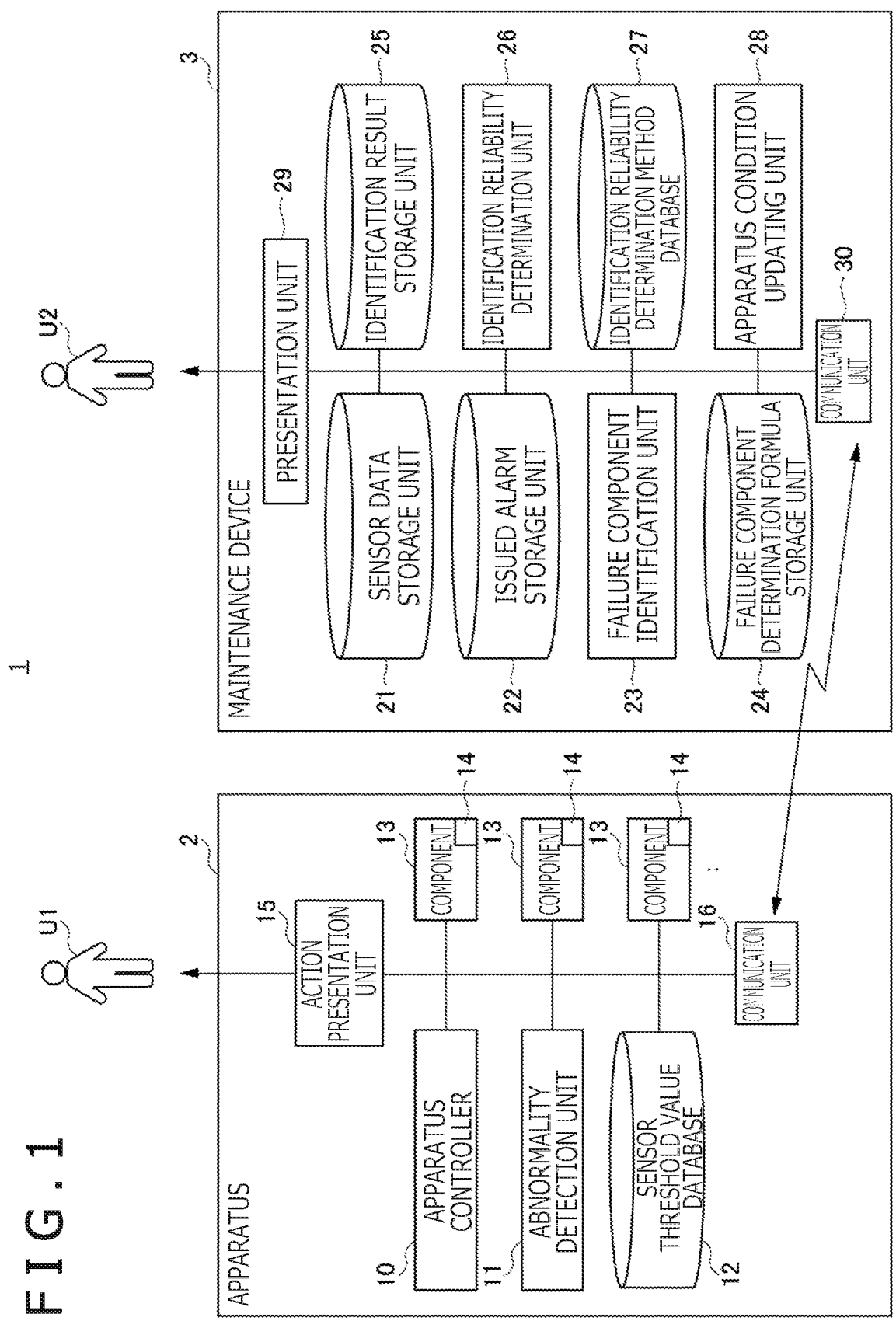
FIG. 1 is a block diagram illustrating an example of the overall construction of a replacement component presentation system according to an embodiment of the present invention.

In the following, embodiments of the present invention will be described with reference to the appended drawings. In the present specification and drawings, the components of substantially the same function or construction are indicated by the same reference numerals, and a redundant description thereof will be left out.

Embodiment

FIG. 1 is a block diagram illustrating an example of the overall construction of a replacement component presentation system 1.

The replacement component presentation system 1 (an example of the presentation system) is equipped with an apparatus 2 and a maintenance device 3. This replacement component presentation system can be used, for example, in maintenance service for medical apparatus, maintenance service for industrial apparatus, etc. An apparatus user U1 uses the apparatus 2. A serviceman U2 utilizes the maintenance device 3 to maintain the apparatus 2. In the following description, the term "failure" means, for example, that a component 13 with which the apparatus 2 is provided is not performing the normal operation, or that the component 13 has ceased to function.

In the following, the specific construction of the apparatus 2 and the maintenance device 3 will be described.

The apparatus 2 is, for example, an apparatus to be maintained by the serviceman U2, such as a generator, construction apparatus, or medical apparatus. The apparatus 2 is equipped with a plurality of components 13 constituting the apparatus 2 such as piping, electric circuit, and bearing, and a sensor installed with respect to each component 13, and a sensor 14 (an example of the measurement unit) measuring the condition of the components 13. Further, it is equipped with an apparatus controller 10 collecting sensor data showing the condition of the component 13 from the sensor 14.

The apparatus controller 10 (an example of the apparatus control unit) controls the operation of the components 13 constituting the apparatus 2. When the apparatus 2 is to be restarted, the apparatus 2 is safely shut down, and then restarting is possible. Apart from the apparatus controller 10, the apparatus 2 is equipped with an abnormality detection unit 11, a sensor threshold value database 12, an action presentation unit 15, and a communication unit 16.

The abnormality detection unit 11 constantly monitors a sensor value (an example of the measurement value) output from the sensor 14. The sensor value measured by the sensor 14 exceeds the range of a sensor threshold value (an example of the measurement threshold value) due to failure of a component 13, the abnormality detection unit 11 issues an alarm indicating the failure of the component 13. When the abnormality detection unit 11 issues an alarm, the apparatus controller 10 transmits the sensor value and the alarm to the maintenance device 3 via the communication unit 16. At this time, transmitted to the maintenance device 3 is sensor data including alarm information including alarm name and alarm issuance time, the sensor measurement time when the sensor 14 measures the sensor value immediately after the issuance of the alarm, and the sensor value.

The sensor threshold value database 12 stores the sensor threshold value of each sensor. The abnormality detection unit 11 can read the sensor threshold value by referring to the sensor threshold value database 12.

The action presentation unit 15 (an example of the second presentation unit) presents to the apparatus user U1 an action urging him to perform the operation of the apparatus 2 such as the restarting of the apparatus 2 in accordance with a command from the maintenance device 3. This action is received by the apparatus controller 10 from the maintenance device 3. The apparatus user U1 can operate the apparatus 2 in accordance with the presented action (an example of the information). As the action presentation unit 15, there is used, for example, a liquid crystal display device or a sound generation device.

Through the control of the apparatus controller 10, the communication unit 16 transmits the alarm issued by the abnormality detection unit 11 and the sensor data to a communication unit 30 of the maintenance device 3. Further, through the control of the apparatus controller 10, the communication unit 16 receives a message urging an action with respect to the apparatus 2 directed by the communication unit 30 of the maintenance device 3. This message is presented through the action presentation unit 15, and the apparatus user U1 can read the message.

The maintenance device 3 is, for example, a portable computer apparatus (tablet terminal or the like). The serviceman U2 can go to the apparatus 2 while carrying the maintenance device 3, and execute the action presented on the presentation unit 29 for the apparatus user U1. This maintenance device 3 is equipped with a sensor data storage unit 21, an issued alarm storage unit 22, a failure component identification unit 23, a failure component determination formula storage unit 24, an identification result storage unit 25, an identification reliability determination unit 26, an identification reliability determination method database 27, an apparatus condition updating unit 28, a presentation unit 29, and a communication unit 30.

The sensor data storage unit 21 stores sensor data received from the apparatus 2 via the communication unit 30. The sensor data storage unit 21 stores the sensor measurement time immediately after the issuance of the alarm and the sensor value in connection with each other. The sensor data storage unit 21 may, however, store the sensor measurement time until the condition indicating the peculiarity of the failure of the component 13 appears after the issuance of the alarm and the sensor value.

Each time an alarm is issued by the abnormality detection unit 11 via the communication unit 30, the issued alarm storage unit 22 stores the nature of the alarm and the alarm issuance time in connection with each other.

After the failure of the component 13, the failure component identification unit 23 identifies the failure component 13 based on the sensor value exhibiting a condition indicating the peculiarity of the failure. However, the time until the condition indicating the peculiarity of the failure appears in the sensor value differs from component 13 to component 13. Thus, the failure component identification unit 23 uses a failure component determination formula described below, and identifies the component 13 out of order (the failure component) based on the sensor value measured by the sensor 14 immediately after the failure stored in the sensor data storage unit 21. After this, in the case where measures to enhance the reliability of the failure component identification result are taken with respect to the apparatus 2, the failure component identification unit 23 identifies the failure component 13 using the sensor value of the sensor data collected from the apparatus 2 again, whereby it is possible to enhance the reliability of the identification result. The measures to enhance the reliability of the identification result mainly consist of an operation performed on the apparatus 2 in order to satisfy the determination condition formula. For example, the measures include the operation of manipulating the apparatus 2 and the operation of restarting the apparatus 2.

The failure component determination formula storage unit 24 stores a failure component determination formula for identifying the component used by the failure component identification unit 23.

The identification result storage unit 25 stores the result of the identification of the failure component identified by the failure component identification unit 23. The identification result includes, for example, the component name of the component 13 determined to be out of order. The identification result may also include, for example, the details of the failure of the component 13.

The identification reliability determination unit 26 determines the reliability of the identification result including the failure component 13 identified by the failure component identification unit 23. At this time, the identification reliability determination unit 26 reads a determination method for determining whether or not the identification result is reliable from the identification reliability determination method database 27 to determine the identification result. At this time, the identification method used by the identification reliability determination unit 26 consists, for example, of a determination condition formula. When the determination result obtained by the identification reliability determination unit 26 using the determination formula indicates that the reliability of the identification result is low, measures to enhance the reliability of the identification result are transmitted to the apparatus 2, and the measures to enhance the reliability of the identification result are presented to the apparatus user U1 by the apparatus 2. Further, in the case where measures to enhance the reliability of the identification result have been taken with respect to the apparatus 2, the identification reliability determination unit 26 determines the reliability of the identification result based on the failure component 13 identified again.

The identification reliability determination method database 27 stores a plurality of determination methods used by the identification reliability determination unit 26 in order to determine whether or not the identification result is reliable. In the present embodiment, as the determination method, there is used, for example, a determination condition formula set for each of a plurality of determination methods. The determination condition formula includes at least one of the following phenomena: that the number of ties that an alarm has been issued exceeds a first predetermined value; that the number of times that the apparatus has been restarted exceeds a second predetermined value; and the number of times that the identification result obtained by the failure component identification unit has coincided exceeds a third predetermined value. Apart from these determination formulas, the condition about how much time has elapsed since the issuance of the first alarm may be added to the determination formulas. Further, the identification reliability determination method database 27 stores information such as the current state of the apparatus 2 for each determination method, a value obtained by multiplying weight to the determination result of the determination condition formula, a message regarding an action to be presented to the apparatus user U1, and the priority in which the action message is presented.

The apparatus condition updating unit 28 stores the current condition of the apparatus 2 in a current condition field 27d of the identification reliability determination method database 27 based on the sensor data, etc. received from the apparatus 2. Further, in the case where it is determined by the identification reliability determination unit 26 that the identification result is not reliable, the apparatus condition updating unit 28 sends a message urging an action on the apparatus 2 to the apparatus 2 in order to make the identification result reliable. Then, the action presentation unit 15 presents an action to the apparatus user U1. In some cases, the message urging an action on the apparatus 2 is presented to the serviceman U2 via the presentation unit 29. After this, when the action on the apparatus 2 is executed, information indicating that the action has been executed is sent to the apparatus condition updating unit 28, and the apparatus condition updating unit 28 updates the current condition field 27d of the identification reliability determination method database 27 to the condition in which the action has been executed.

The presentation unit 29 (an example of the first presentation unit) presents measures to enhance the reliability of the identification result to the serviceman U2. When there is attained a state in which the identification result of the failure component is reliable, the presentation unit 29 presents the failure component to the serviceman U2. Based on the failure component presented by the presentation unit 29, the serviceman U2 can make preparations for the failure component to be replaced, go to the apparatus 2, and replace the failure component 13 with a new component 13.

Next, the hardware configuration of the computer C constituting the maintenance device 3 will be described.

Figure 2:
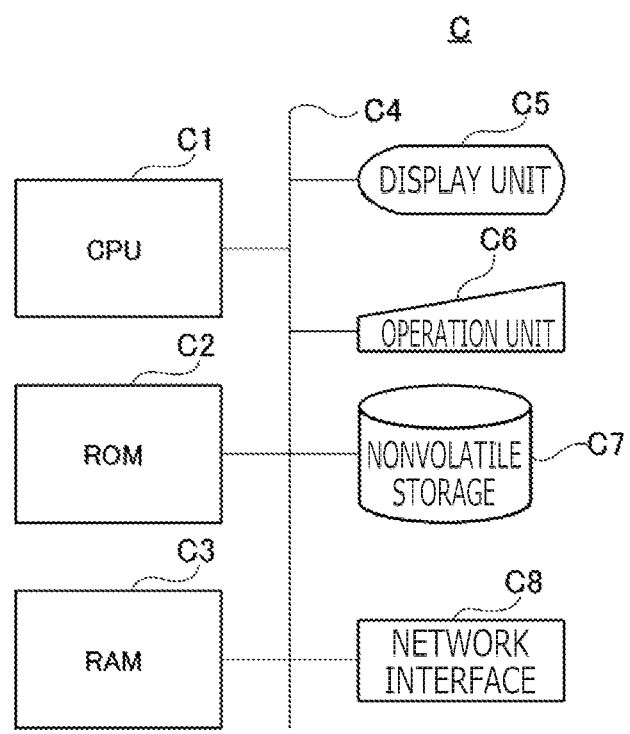
FIG. 2 is a block diagram illustrating an example of the hardware construction of a computer according to an embodiment of the present invention.

FIG. 2 is a block diagram illustrating an example of the hardware configuration of the computer C.

The computer C is hardware used as a so-called computer. The computer C is equipped with a central processing unit (CPU) C1, a read only memory (ROM) C2, and a random access memory (RAM) C3 which are connected to a bus C4. Further, the computer C is equipped with a display unit C5, an operation unit C6, a nonvolatile storage C7, and a network interface C8.

The CPU C1 reads the program code of software realizing each function according to the present embodiment from the ROM C2 and executes it. A variable, parameter, etc. generated halfway through the computation processing are temporarily written to the RAM C3. The function of each function unit with which the maintenance device 3 is provided is realized by the CPU C1. The display unit C5 is, for example, a liquid crystal display monitor, which displays to the serviceman U2 the result, etc. of the processing conducted by the computer C. As the operation unit C6, there is used, for example, a keyboard and mouse, making it possible for the serviceman U2 to perform a predetermined operation input and instruction.

Examples of the nonvolatile storage C7 used include a hard disk drive (HDD), a solid state drive (SSD), a flexible disk, an optical disk, a magneto-optical disk, a CD-ROM, a CD-R, a magnetic tape, and a nonvolatile memory. Apart from an operating system (OS) and various parameters, this nonvolatile storage C7 records a program for causing the computer C to function. The ROM C2 and the nonvolatile storage C7 record programs, data, etc. necessary for operating the CPU C1, and are used as an example of a computer-readable, non-transient recording medium storing a program to be executed by the computer C. Thus, the ROM C2 and the nonvolatile storage C7 permanently store this program. The storage units and database with which the maintenance device 3 is provided are formed in the nonvolatile storage C7.

The network interface C8 uses, for example, a network interface card (NIC), and allows transmission and reception of various items of data between devices via a local area network (LAN) to which a terminal is connected, a dedicated line, etc. The communication unit 30 conforms to the network interface C8.

Next, an example of the inner structure of each database and the storage unit will be described.

Figure 3:
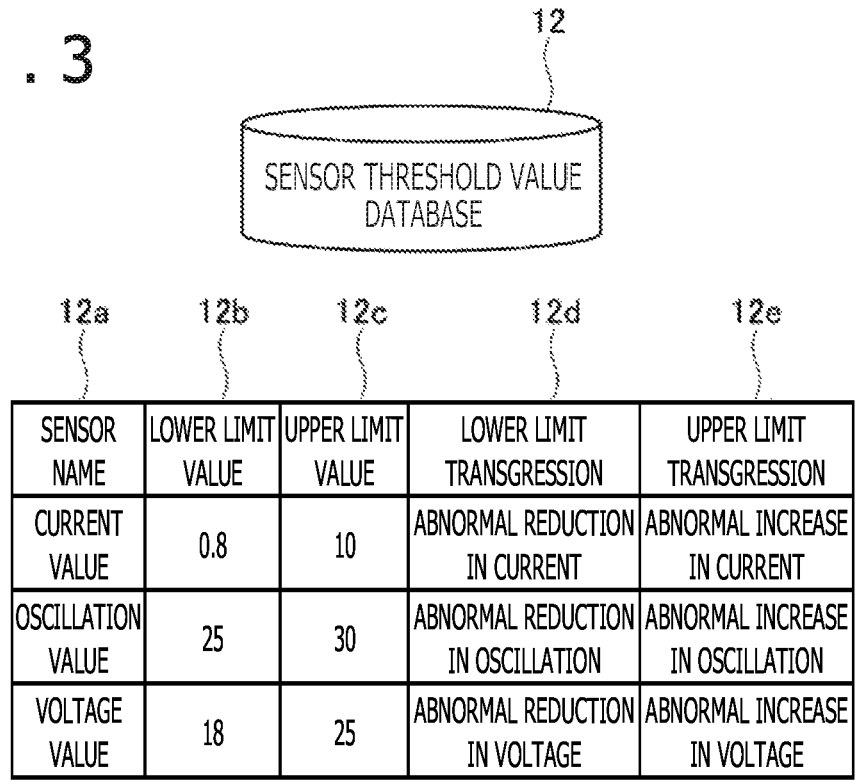
FIG. 3 is an explanatory view of an example of the inner structure of a sensor threshold value database according to an embodiment of the present invention.

FIG. 3 is an explanatory view of an example of the inner structure of the sensor threshold value database 12.

The sensor threshold value database 12 has a sensor name field 12a, a lower limit value field 12b, an upper limit value field 12c, a lower limit transgression field 12d, and an upper limit transgression field 12e.

The sensor name field 12a stores the names of physical amounts (sensor names) measured by the sensor 14. The abnormality detection unit 11 can refer to the lower limit value field 12b and the upper limit value field 12c based on the sensor names stored in the sensor name field 12a.

The lower limit value field 12b stores lower limit values of the sensor data as lower limit sensor threshold values.

The upper limit value field 12c stores upper limit values of the sensor data as upper limit sensor threshold values.

The lower limit transgression field 12d stores the names of lower limit transgression alarms issued by the abnormality detection unit 11 when the sensor value of the sensor data becomes lower than the lower limit threshold value.

The upper limit transgression field 12e stores the names of upper limit transgression alarms issued by the abnormality detection unit 11 when the sensor value of the sensor data becomes higher than the upper limit threshold value.

Figure 4:
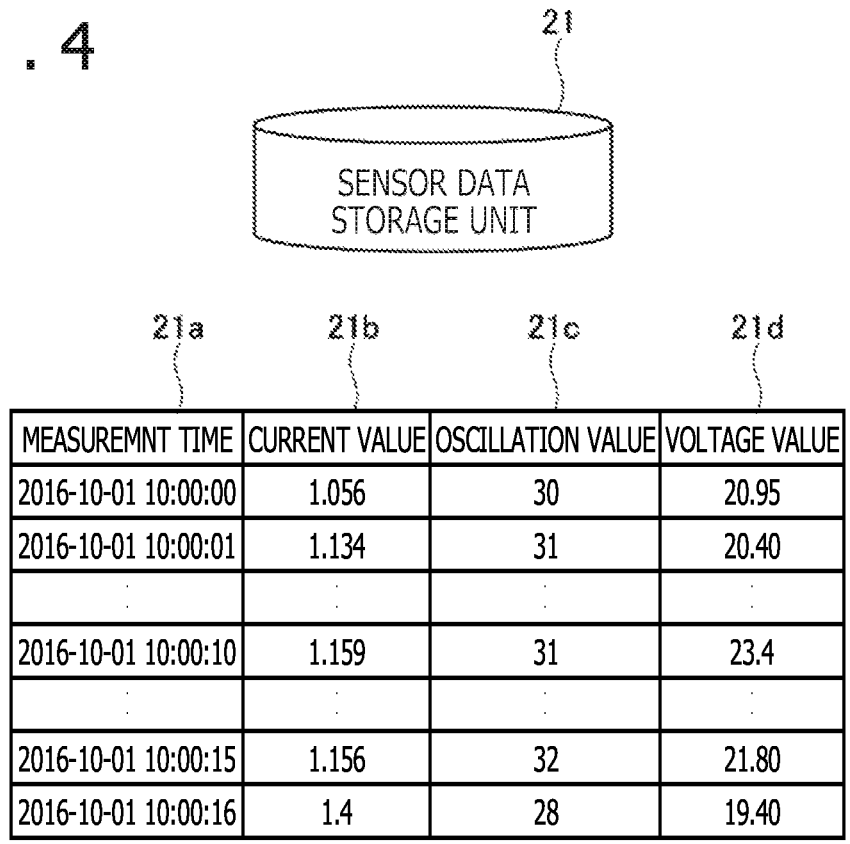
FIG. 4 is an explanatory view of an example of the inner structure of a sensor data storage unit according to an embodiment of the present invention.

FIG. 4 is an explanatory view of an example of the inner structure of the sensor data storage unit 21.

The sensor data storage unit 21 has a measurement time field 21a, a current value field 21b, an oscillation value field 21c, and a voltage value field 21d. The sensor data transmitted from the apparatus 2 to the maintenance device 3 includes the measurement time of the sensor data and the sensor value.

The measurement time field 21a stores the sensor data measurement times.

The current value field 21b stores the current values of the component 13.

The oscillation value field 21c stores the oscillation values of the component 13.

The voltage value field 21d stores the voltage values of the component 13.

The current values, the oscillation values, and the voltage values of the component 13 are given as an example of the sensor values included in the sensor data.

Figure 5:
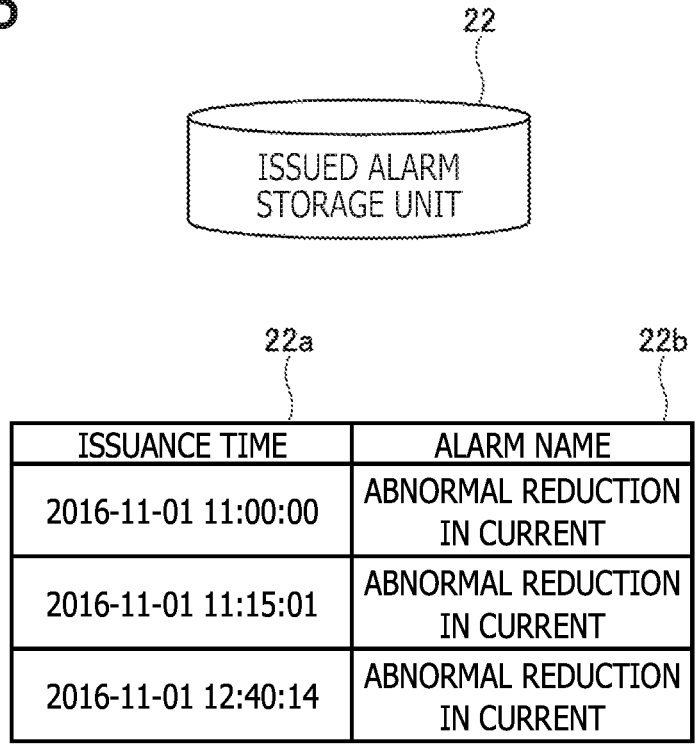
FIG. 5 is an explanatory view of an example of the inner structure of an issued alarm storage unit according to an embodiment of the present invention.

FIG. 5 is an explanatory view of an example of the inner structure of the issued alarm storage unit 22.

The issued alarm storage unit 22 has an issuance time field 22a and an alarm name field 22b. The issued alarm storage unit 22 is a storage medium such as memory storing alarm information received from the apparatus 2.

The issuance time field 22a stores the issuance time of the alarm issued from the abnormality detection unit 11.

The alarm name field 22b stores the alarm name. The alarm name is information defined when designing the apparatus 2.

Figure 6:
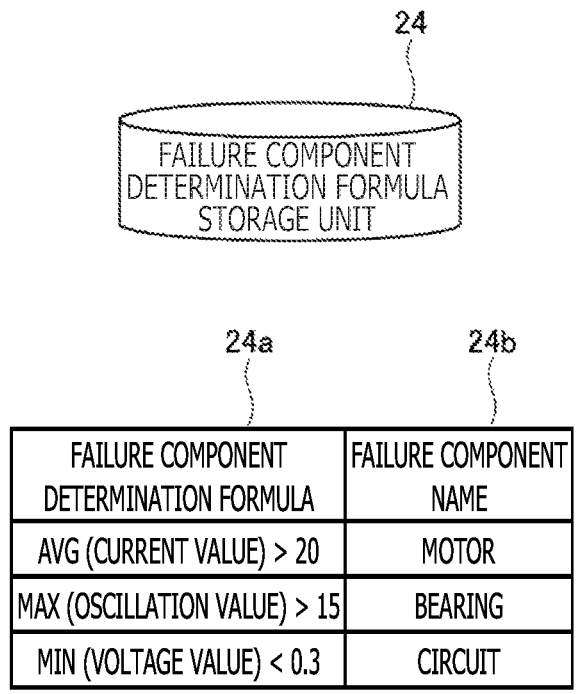
FIG. 6 is an explanatory view of an example of the inner structure of a failure component determination formula storage unit according to an embodiment of the present invention.

FIG. 6 is an explanatory view of an example of the inner structure of the failure component determination formula storage unit 24.

The failure component determination formula storage unit 24 has a failure component determination formula field 24a and a failure component name field 24b. The failure component determination formula and the failure component name stored in the failure component determination formula storage unit 24 are information defined at the time of the introduction of the maintenance device 3.

The failure component determination formula field 24a stores a failure component determination formula by means of which the failure component identification unit 23 determines whether or not the failure 13 is out of order.

The failure component name field 24b stores the name of the component 13, which is determined to be out of order when it satisfies the failure component determination formula, as the failure component name.

For example, in a case of AVG (current value) >20 shown in the failure component determination formula of the first line, it is determined that the failure component is the motor in the case where the average value of the current values measured by the sensor 14 exceeds 20. Here, each value in the failure component determination formula is a statistical value of the sensor value, and is different from the sensor threshold value. Thus, in some cases, not only the average value of the sensor values but also the maximum value and the minimum value are used in the failure component determination formula.

Figure 7:
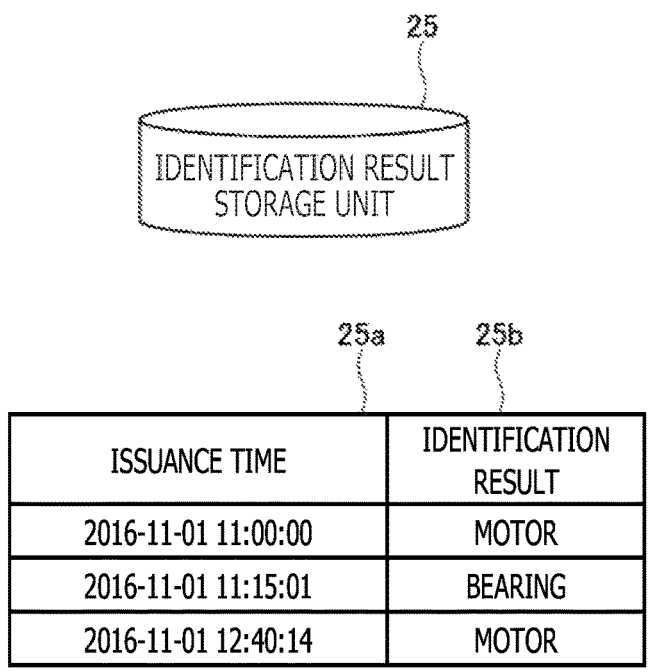
FIG. 7 is an explanatory view of an example of the inner structure of an identification result storage unit according to an embodiment of the present invention.

FIG. 7 is an explanatory view of an example of the inner structure of the identification result storage unit 25.

The identification result storage unit 25 has an issuance time field 25a and an identification result field 25b.

The issuance time field 25a stores the same times as the alarm issuance times stored in the issuance time field 22a of the issued alarm storage unit 22.

The identification result field 25b stores the name of the failure component identified by the failure component identification unit 23 as the identification result.

Figure 8:
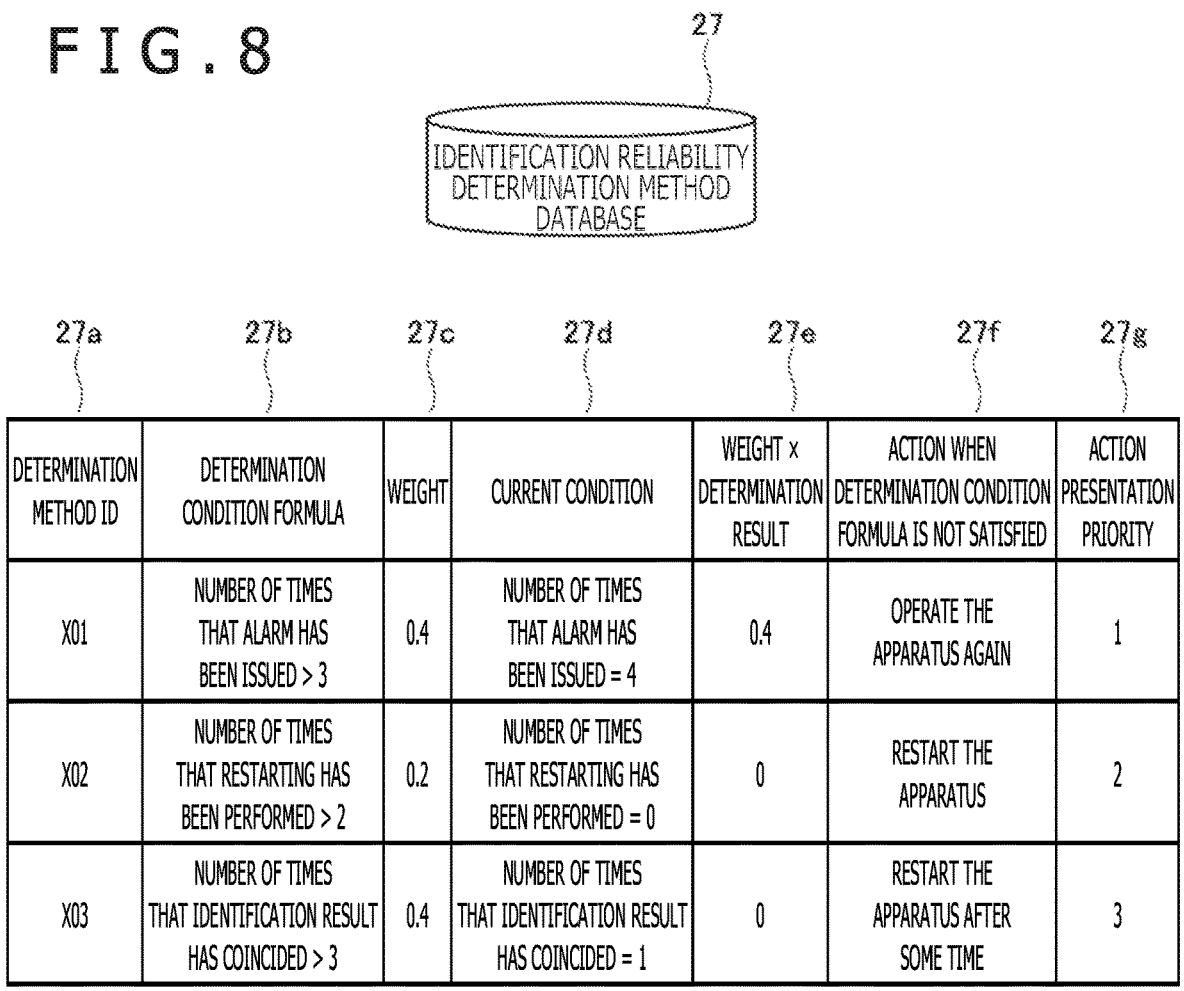
FIG. 8 is an explanatory view of an example of the inner structure of an identification reliability determination method database according to an embodiment of the present invention.

FIG. 8 is an explanatory view of an example of the inner structure of the identification reliability determination method database 27.

The identification reliability determination method database 27 has a determination method ID field 27a, a determination condition formula field 27b, a weight field 27c, and a current condition field 27d. Further, the identification reliability determination method database 27 has a weight×determination result field 27e, an action field 27f, and an action presentation priority field 27g.

The determination method ID field 27a stores a determination method ID for uniquely identifying the determination methods.

The determination condition formula field 27b stores determination condition formulas indicating the condition, etc. for enhancing the reliability of the identification result of the failure component identified by the failure component identification unit 23. The determination result that the identification reliability determination unit 26 obtains by using the determination condition formula is used for the calculation of the value stored in the weight×determination result field 27e. For example, when the determination method ID is "X01," "the number of times that the alarm has been issued >3 (an example of the first predetermined value)" is expressed as the determination condition formula. When the determination method ID is "X02," "the number of times that restarting has been performed >2 (an example of the second predetermined value)" is expressed as the determination condition formula. When the determination method ID is "X03," "the number of times that the identification result has coincided >3 (an example of the third predetermined value)" is expressed as the determination condition formula.

The weight field 27c stores the weight added when the current condition of the apparatus 2 satisfies the determination condition formula.

The information stored in the fields 27a through 27c is stored as a design matter at the time of the introduction of the maintenance device 3.

The current condition field 27d stores the current condition of the apparatus 2 which is updated by the apparatus condition updating unit 28.

When the current condition of the apparatus 2 satisfies the determination condition formula, the weight×determination result field 27e stores a value obtained by multiplying a weight to the determination result for each determination method (also referred to as the "weighted determination result"). When the condition of the apparatus 2 satisfies the determination condition formula for determining the reliability of the identification result of the failure component, the identification reliability determination unit 26 calculates the weighted determination result, and stores this weighted determination result in the weight×determination result field 27e. Here, when the determination condition formula is satisfied and the identification result of the failure component is reliable, the weight is multiplied by "1," and when the determination condition formula is not satisfied and the identification result of the failure component is not reliable, the weight is multiplied by "0." The identification reliability determination unit 26 determines the reliability of the identification result of the failure component obtained by the failure component identification unit 23 depending upon whether or not the sum total of the weighted determination results calculated for the plurality of determination condition formulas exceeds the range of the reliability threshold value. For example, when the result obtained through addition in the vertical direction of the weight×determination result field 27e exceeds the reliability threshold value (e.g., "0.5"), it is determined that the identification result of the failure component is reliable.

When the condition up to now of the apparatus 2 which has issued an alarm does not satisfy the determination condition formula, the action field 27f stores the action on the apparatus 2 presented to the apparatus user U1 via the action presentation unit 15. The apparatus user U1 executes the action presented in the action presentation unit 15, whereby the reliability of the failure component identification result is enhanced.

When a plurality of actions are stored in the action field 27f, the action presentation priority field 27g stores the priority of the action presented in the action presentation unit 15. When there are a plurality of actions the apparatus user U1 is asked to execute, the action of large weight is of higher priority, and this action is presented to the apparatus user U1. In the case of values of the same weight, the priority of the action becomes higher in the ascending order of the determination method ID. The action presentation priority field 27g is a design matter determined at the time of the introduction of the maintenance device 3 taking into consideration the convenience for the apparatus user U1 performing the action.

The values stored in the identification reliability determination method database 27 differ from apparatus 2 to apparatus 2, so that, in some cases, the highest action presentation priority is allotted to the action of restarting, the determination method ID of which is "X02." Further, regarding the determination condition formulas, there are stored various formulas in addition to those shown in FIG. 8.

Next, an example of the processing performed in the replacement component presentation system 1 will be described with reference to FIGS. 9 and 10.

Figure 9:
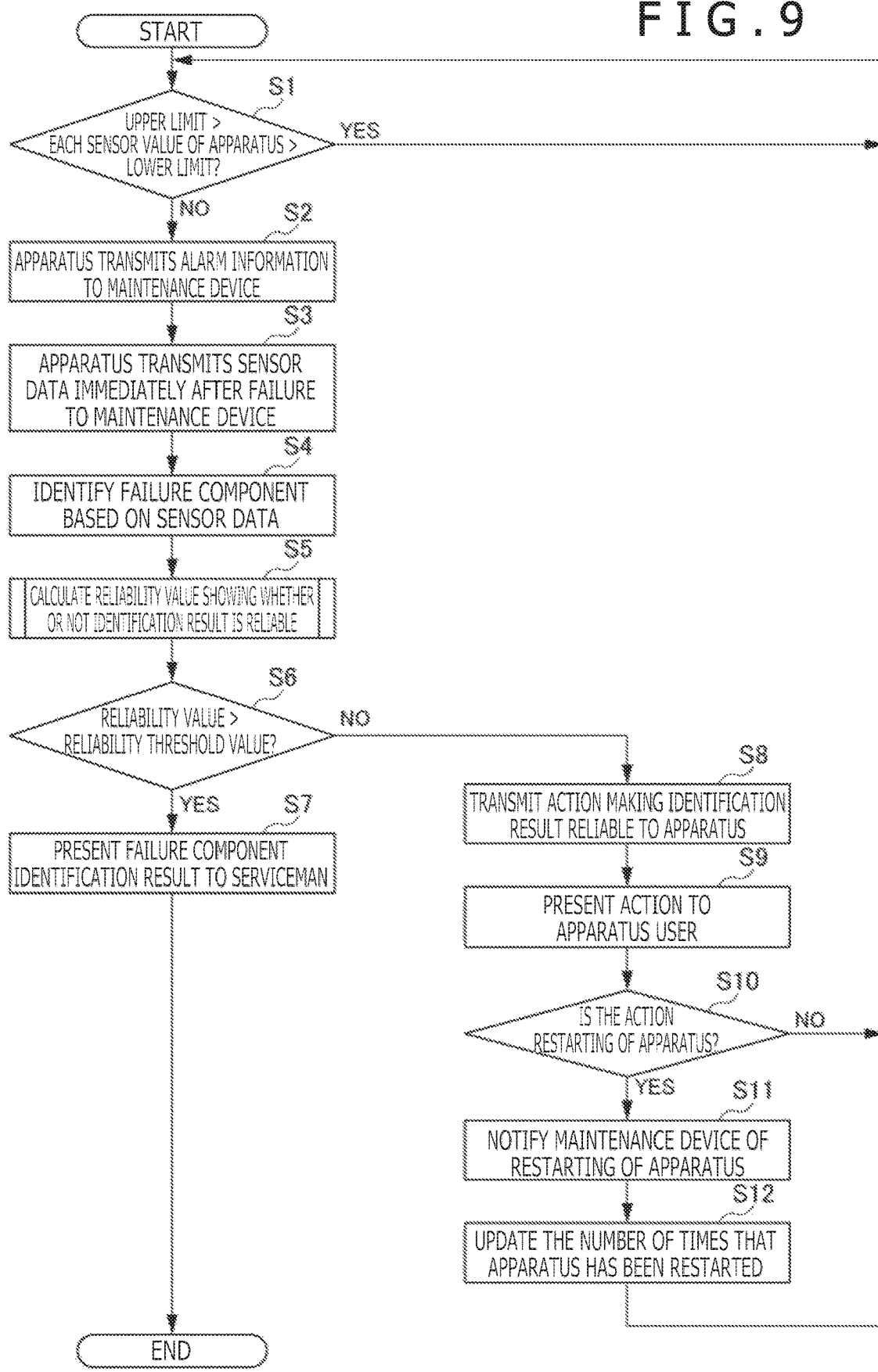
FIG. 9 is a flowchart illustrating a main routine of the replacement component presentation system according to an embodiment of the present invention.

FIG. 9 is a flowchart illustrating the main routine of the replacement component presentation system 1.

Figure 10:
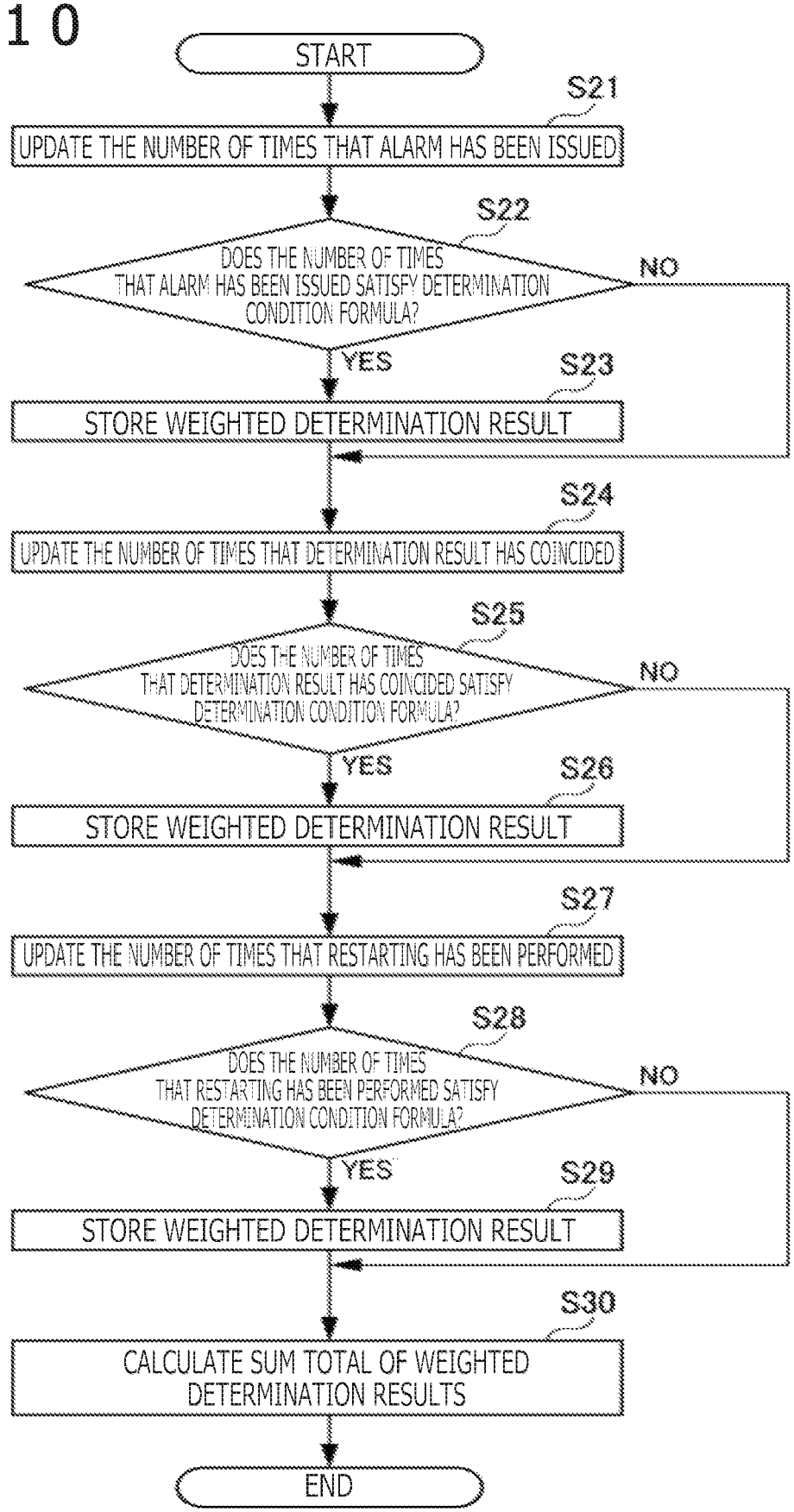
FIG. 10 is a flowchart illustrating a subroutine invoked in step S5 of FIG. 9 and executed.

FIG. 10 is a flowchart illustrating a subroutine invoked and executed in step S5 of FIG. 9.

First, the abnormality detection unit 11 of the apparatus 2 determines whether or not the component 13 is out of order. The failure determination of the component 13 is made based on whether or not the sensor value input from the sensor 14 is within the range between the upper limit value and the lower limit value (S1). The upper limit value and the lower limit value are values stored in the upper limit value field 12c and the lower limit value field 12b of the sensor threshold value database 12. When all the sensor values are within the range between the upper limit value and the lower limit value (YES in step S1), it is to be assumed that the component 13 is not out of order but is operating in the normal fashion, so that the procedure returns to step S1, and the abnormality detection unit 11 repeats the failure determination of the component 13.

On the other hand, when one of the sensor values is out of the range between the upper limit value and the lower limit value (NO instep S1), there is the possibility of the component 13 to which the sensor 14 is mounted being out of order. Thus, the alarm information issued by the abnormality detection unit 11 is transmitted to the maintenance device 3 via the communication unit 16 through the control of the apparatus controller 10 (S2). As stated above, the alarm information includes the alarm name, alarm issuance time, etc. In step S2, when the sensor value is less than the lower limit value, the apparatus controller 10 transmits the alarm name of the lower limit transgression field 12d to the maintenance device 3. When the sensor value exceeds the upper limit value, it transmits the alarm name of the upper limit transgression field 12e to the maintenance device 3. Further, the apparatus controller 10 sets a current time when the alarm is issued as the alarm issuance time, and transmits the alarm issuance time as a part of the alarm information to the maintenance device 3. Then, the communication unit 30 of the maintenance device 3 stores the alarm information received by the apparatus 2 in the issued alarm storage unit 22. At this time, the alarm issuance time is stored in the issuance time field 22a of the issued alarm storage unit 22, and the alarm name is stored in the alarm name field 22b.

Next, the apparatus controller 10 transmits the sensor data immediately after the failure to the maintenance device 3 (S3). Then, the communication unit 30 of the maintenance device 3 stores the sensor data received from the apparatus 2 in the sensor data storage unit 21. At this time, the measurement time field 21a of the sensor data storage unit 21 stores the measurement time of that the communication unit 30 has received from the apparatus 2, and the current value field 21b, the oscillation value field 21c, and the voltage value field 21d store the respective sensor values based on the sensor data.

Next, the failure component identification unit 23 reads the sensor value stored in the sensor data storage unit 21, and identifies the failure component based on the failure component determination formula stored in the failure component determination formula field 24a of the failure component determination formula storage unit 24 (S4). For example, the failure component identification unit 23 obtains the average value of the current values based on the result of addition in the time direction of the current values read from the sensor data storage unit 21, and when the average value of the current values exceeds "20," it identifies the motor as the failure component.

Next, the identification reliability determination unit 26 calculates a reliability value indicating whether or not the failure component identification result identified by the failure component identification unit 23 is reliable (S5). This reliability value is used to determine whether or not the identification result is reliable by the weight of the plurality of determination methods stored in the identification reliability determination method database 27. The details of the processing of calculating the reliability value of step S5 are shown in the sub routine flowchart of FIG. 10.

Here, the details of the processing of step S5 will be described with reference to FIG. 10.

First, the apparatus condition updating unit 28 updates the number of times that the alarm has been issued (S21). At this time, the apparatus condition updating unit 28 counts the number of times that the alarm has been issued stored in the issued alarm storage unit 22, and updates the current condition field 27d of the identification reliability determination method database 27 of FIG. 8 the determination method ID line of which is "X01" by overwriting a number obtained by adding 1 to the number of times that the alarm has been issued.

Next, the identification reliability determination unit 26 determines whether or not the number of times that the alarm has been issued updated through the overwriting of the current condition field 27d satisfies the determination condition formula stored in the determination condition formula field 27b (S22). In the case where the determination condition formula is not satisfied (NO in step S22), the procedure advances to step S24.

On the other hand, when the determination condition formula is satisfied (YES in step S22), the identification reliability determination unit 26 stores the weighted determination result of the number of times that the alarm has been issued in the identification reliability determination method database 27 (S23). The weighted determination result is an indicator used to determine whether or not the identification result of the failure component identified by the failure component identification unit 23 is reliable, and the sum total of the weighted determination results calculated by the determination methods is used as the reliability value. For example, when the number of times that the alarm has been issued is four, the determination condition formula expressed in "X01" of the determination method ID is satisfied. In this case, in the line where the determination method ID field 27a is "X01, " the identification reliability determination unit 26 stores "0.4" stored in the weight field 27c in the weight×determination result field 27e.

Next, the apparatus condition updating unit 28 updates the number of times that the identification result of the failure component identified and satisfying the component determination formula has coincided (S24). At this time, the apparatus condition updating unit 28 refers to the identification result field 25b of the identification result storage unit 25, and counts the number of times that the identification result stored in the identification result field 25b has successively coincided, updating the line of the current condition field 27d of the identification reliability determination method database 27 the identification method ID of which is "X03" through the overwriting of a number obtained by adding 1 to the number of times that the identification results has coincided. For example, when the identification result of the failure component is successively "motor," the number of times that the identification result has coincided is "2."

Next, the identification reliability determination unit 26 determines whether or not the number of times that the identification result obtained by updating the current condition field 27d through overwriting has coincided satisfies the determination condition formula stored in the determination condition formula field 27b (S25). In the case where the determination condition formula is not satisfied (NO in step S25), the procedure advances to step S27.

On the other hand, in the case where the determination condition formula is satisfied (YES in step S25), the identification reliability determination unit 26 stores the weighted determination result of the number of times that the identification result has coincided in the identification reliability determination method database 27 (S26). For example, in the line where the determination method ID field 27a is "X03, " the identification reliability determination unit 26 stores "0.2" stored in the weight field 27c in the weight×determination result field 27e. As shown in FIG. 8, however, in this example, the number of times that the identification result has coincided is "1," so that the determination condition formula is not satisfied, and "0" is stored as the weighted determination result in the weight×determination result field 27e.

First, the apparatus condition updating unit 28 updates the number of times that the apparatus 2 has been restarted (S27). At this time, the apparatus condition updating unit 28 updates the line of the current condition field 27d of the identification reliability determination method database 27 the determination method ID of which is "X02" through the overwriting of a number obtained by adding 1 to the number of times that restarting has been performed.

Next, the identification reliability determination unit 26 determines whether or not the number of times that restarting has been performed obtained by updating the current condition field 27d through overwriting satisfies the determination condition formula stored in the determination condition formula field 27b (S28). In the case where the determination condition formula is not satisfied (NO in step S28), the procedure advances to step S30.

On the other hand, in the case where the determination condition formula is satisfied (YES in step S28), the identification reliability determination unit 26 stores the determination result of the number of times that restarting has been performed in the identification reliability determination method database 27 (S29). For example, in the line where the determination method ID field 27a is "X02, " the identification reliability determination unit 26 stores "0.2" stored in the weight field 27c in the weight×determination result field 27e. As shown in FIG. 8, however, in this example, the number of times that restarting has been performed is "0," so that the determination condition formula is not satisfied, and "0" is stored in the weight× determination result field 27e.

After the completion of the execution of the sub routine of steps S21 through S29, the identification reliability determination unit 26 calculates the sum total of the weighted determination results stored in the weight×determination result field 27e of the identification reliability determination method database 27 as the reliability value (S30). Then, the identification reliability determination unit 26 returns the sum total value of the weighted determination results stored in the weight×determination result field 27e of FIG. 8 to the main routine as the reliability value. As shown in the identification reliability determination method database 27 of FIG. 8, the reliability value is calculated, for example, as follows: 0.4+0+0=0.4. Thus, "0.4" is returned to the main routine as the reliability value. After the return of the reliability value to the main routine, the procedure advances to step S6.

Going back to step S6 of FIG. 9, the description of the main routine will be continued.

The identification reliability determination unit 26 determines whether or not the reliability value returned from the sub routine has exceeded a reliability threshold value (S6). The reliability threshold value is a value set as a design matter at the time of the introduction of the maintenance device 3. For example, "0.5" is set as the reliability threshold value.

When it is determined by the identification reliability determination unit 26 that the reliability value is in excess of the reliability threshold value (YES in step S6), the identification result of the failure component is reliable, so that the component name of the failure component identified by the failure component identification unit 23 in step S4 is presented to the serviceman U2 by the presentation unit 29 (S7). For example, when it is determined in step S4 that the failure component is the motor, a message urging the replacement of the motor is presented to the serviceman U2 by the presentation unit 29 (see FIG. 12 referred to below). When step S7 is completed, the main routine is completed.

On the other hand, in the case where, in step S6, it is determined by the identification reliability determination unit 26 that the reliability value has not exceeded the reliability threshold value (NO in step S6), the failure component identification result is not reliable, so that the procedure advances to step S8.

First, the identification reliability determination unit 26 transmits an action to the communication unit 16 of the apparatus 2 via the communication unit 30 (S8). This is an action urging the apparatus user U1 to execute it in order to make the identification result reliable. The identification reliability determination unit 26 performs the processing referring to the weight×determination result field 27e, the action field 27f, and the action presentation priority field 27g of the identification reliability determination method database 27, which are mainly stored in step S5. The action presentation unit 15 of the apparatus 2 presents the action received by the communication unit 16 to the apparatus user U1 (S9).

The identification reliability determination unit 26 refers to the determination method of the line where the value of the weight×determination result field 27e is "0," whereby the action presented to the apparatus user U1 is read from the action field 27f when the determination condition formula is not satisfied. In the case where there are a plurality of lines where the value of weight×determination result field 27e is "0," there is read, of the plurality of lines, the action of highest priority in the storage in the action presentation priority field 27g. For example, in the identification reliability determination method database 27, "1" is of the highest priority, and "3" is of the lowest priority. In FIG. 8, as the action of the line where the determination method ID field 27a is "X02," there is read the message: "Restart the apparatus," and this message is presented to the apparatus user U1 by the action presentation unit 15.

Next, the apparatus controller 10 determines whether or not the action presented to the apparatus user U1 is the restarting of the apparatus 2 (S10). In the case where the action of restarting is not presented (NO in step S10), the procedure returns to step S1, and the abnormality detection unit 11 makes the failure determination again, with the maintenance device 3 waiting for the alarm to be issued from the apparatus 2 again.

On the other hand, in the case where the action of restarting is presented (YES in step S10), the apparatus user U1 restarts the apparatus 2. Here, before the apparatus 2 is shut down, the apparatus controller 10 notifies the maintenance device 3, via the communication unit 16, of the information indicating the restarting of the apparatus 2 (S11).

When the apparatus condition updating unit 28 of the maintenance device 3 receives the information indicating the restarting of the apparatus 2 via the communication unit 30, it stores the fact that the apparatus 2 has been restarted in the identification reliability determination method database 27. At this time, the apparatus condition updating unit 28 updates the number of times that restarting has been performed to be stored in the current condition field 27d in the identification reliability determination method database 27 by adding 1 thereto (S12). After this, the procedure returns to step S1, and the abnormality detection unit 11 performs the failure determination again.

Figure 11A:
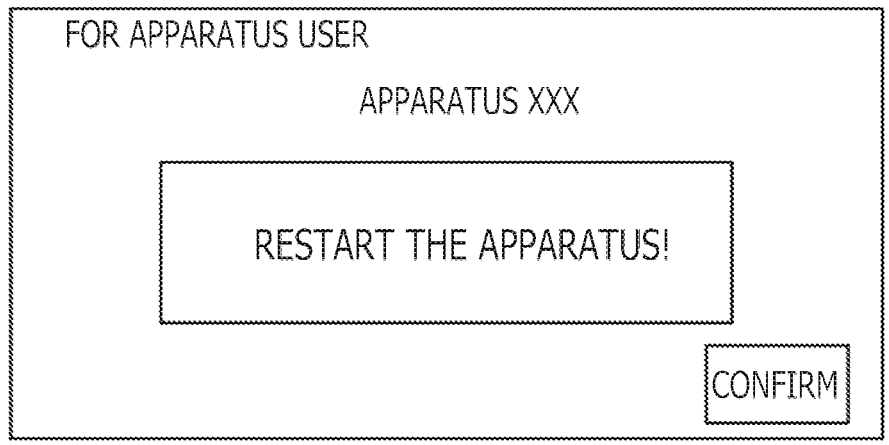
FIGS. 11A and 11B are explanatory views of an action presentation unit according to an embodiment of the present invention and a display example of the information presented by the presentation unit.
Figure 11B:
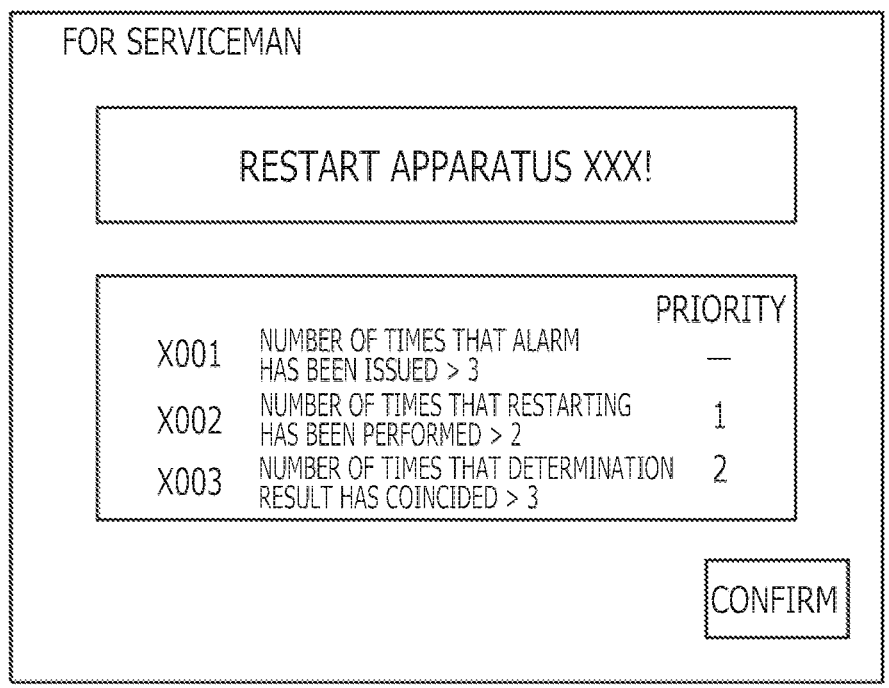

FIGS. 11A and 11B are explanatory views of an example of the display of information presented by the action presentation unit 15 and the presentation unit 29. FIG. 11A shows an example of information presented to the apparatus user U1 by the action presentation unit 15, and FIG. 11B shows an example of information presented to the serviceman U2 by the presentation unit 29. The presentation of an action is conducted in step S9 of FIG. 9.

As shown in FIG. 11A, the specific substance of the action to be performed on the apparatus 2 is displayed to the apparatus user U1. Examples of the action include the message urging the restarting of the apparatus 2.

As shown in FIG. 11B, apart from the action to be performed on the apparatus 2, the determination condition formula and priority are presented to the serviceman U2. Thus, after checking the action presented through the maintenance device 3, the serviceman U2 can go to the apparatus 2, and know the priority of the action to be conducted for the apparatus user U1 and the action presented at present. In this example, the number of times that the alarm has been issued is already three or more, thus, in order to make the number of times that the apparatus has been restarted be two or more, the message urging the serviceman U2 to perform restarting is shown with the highest priority so as to satisfy the determination condition formula whose determination method ID is expressed as "X02." Accordingly, the serviceman U2 can tell the action making it possible to obtain the determination result satisfying the determination condition formula.

Figure 12:
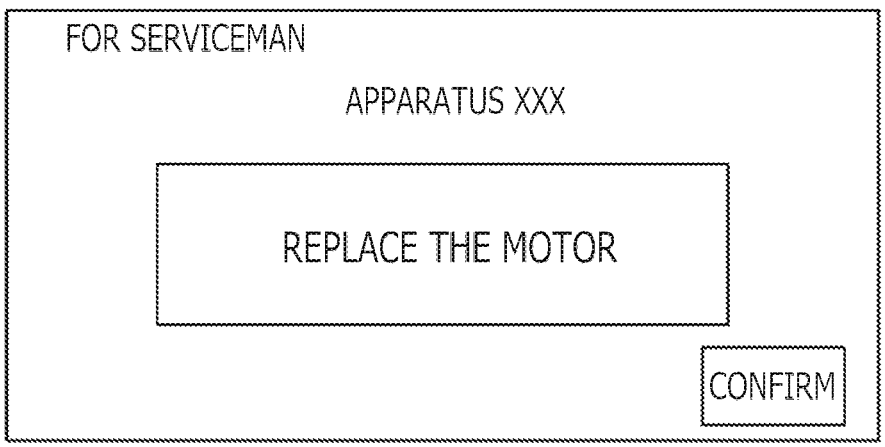
FIG. 12 is an explanatory view of a display example of a replacement component presented by the presentation unit according to an embodiment of the present invention.

FIG. 12 is an explanatory view of a display example of the replacement component presented by the presentation unit 29. The presentation of the replacement component is conducted in step S7 of FIG. 9.

In the case where the sum total of the weighted determination results stored in the identification reliability determination method database 27 is sufficiently large, and where the reliability of the failure component identified by the failure component identification unit 23 is sufficiently high, it is presented to the serviceman U2 by the presentation unit 29 that the failure component 13 should be replaced. As a result, the serviceman U2 can prepare a new component 13 for replacement and replace the component 13 by the new one at the apparatus 2, thus making it possible to avoid erroneously replacing the wrong component 13.

In the replacement component presentation system 1 according to the embodiment described above, when abnormality is generated in the sensor data and an alarm is issued, the failure component is identified based not only on the sensor data measured and output by the sensor 14 immediately after the failure of the component 13 but also on the sensor data indicating the failure state a little time after the occurrence of the failure. At this time, the state before the failure does not remain in the sensor data used for the identification of the failure component, and the failure condition appears a little time after the occurrence of the failure, so that it is possible to accurately identify the failure component.

Thus, the maintenance device 3 does not immediately determine the condition of the component 13 based solely on sensor data received from the apparatus 2 for the first time. Instead, it identifies the failure component when some action has been performed and the identification result of the failure component has become reliable. To determine whether or not the failure condition of the component 13 appears in the sensor data, there is used, for example, three kinds of determination condition formulas stored in the identification reliability determination method database 27. The effective determination method differs depending upon the specifications of the apparatus 2 and the component 13. Thus, a weighted determination result is used for each determination method, whereby it is possible to select an optimum determination method.

To make the failure component identification result reliable, the action presentation unit 15 can present to the apparatus user U1 an action such as turning on the power source of the apparatus 2 again. The apparatus user U1 performs the presented action on the apparatus 2, whereby the sensor value of the sensor data collected from the apparatus 2 approximates the sensor value measured in the failure state of the component 13. Thus, the maintenance device 3 can accurately identify the failure component by using the sensor data collected from the apparatus 2 and the alarm information.

In the maintenance service for the apparatus 2, when the serviceman U2 ascertains an alarm indicating failure of the apparatus 2, it is necessary to identify the failure component and to replace the failure component by a new component 13. Thus, the failure component identified by the maintenance device 3 is presented to the serviceman U2, whereby it is possible for the serviceman U2 to replace the component 13. At this time, the identified failure component is presented to the serviceman U2, so that even if the serviceman U2 is unskilled, he can replace the failure component.

[Modifications]

When the maintenance device 3 identifies the substance of the failure, it is possible to present the substance of the failure to the apparatus user U1 or the serviceman U2 and to present measures to restore the apparatus 2 to normal.

The present invention is not restricted to the above-described embodiment but naturally allows various other applications and modifications without departing from the scope of the gist of the present invention as claimed in the appended claims.

For example, in the above description of the embodiment, the construction of an apparatus and a system has been described in detail and specifically in order to facilitate the understanding of the present invention, which is not always restricted to a construction equipped with all the components mentioned above. Further, a part of the construction of the embodiment described above can be replaced by the construction of some other embodiment. Furthermore, it is also possible to add the construction of some other embodiment to the construction of a certain embodiment. Further, addition, deletion, and replacement of another construction are acceptable with respect to a part of the construction of each embodiment.

Regarding the control lines and information lines, only those to be regarded necessary for the description are shown, and not all the control lines and information lines of a product are shown. Actually, it may be assumed that almost all the constructions are mutually connected together.

What is claimed is:

1. A maintenance device comprising:
   a failure component identification unit that collects an alarm issued when a measurement value, which is obtained by a measurement unit installed in an apparatus being a maintenance target, the measuring unit measuring a condition of a component constituting the apparatus, exceeds a range of a measurement threshold value upon the component being out of order and that collects the measurement value transmitted with the alarm from the apparatus, the failure component identification unit identifying the failure component on the basis of the measurement value exhibiting a condition indicating a peculiarity of the failure after the failure of the component;
   an identification reliability determination unit that determines a reliability of the failure component identification result obtained by the failure component identification unit; and
   a presentation unit that, when it is determined by the identification reliability determination unit that the reliability of the identification result is low, presents measures to enhance the reliability of the identification result until the measurement value exhibits a condition indicating the peculiarity of the failure,
   wherein when the reliability of the identification result is determined to be low, the identification reliability determination unit transmits measures to enhance the reliability of the identification result presented by the apparatus to the apparatus, and causes the apparatus to present measures to enhance the reliability of the identification result.

2. The maintenance device according to claim 1, wherein the identification reliability determination unit calculates weighted determination results when the condition of the apparatus satisfies determination condition formulas for determining the reliability of the identification result, and determines that the reliability of the identification result is high when a sum total of the determination results calculated for each of the determination condition formulas exceeds a reliability threshold value.

3. The maintenance device according to claim 2, wherein when measures to enhance the reliability of the identification result have been taken with respect to the apparatus, the failure component identification unit collects the measurement value from the apparatus again and identifies the failure component, and
   the identification reliability determination unit determines the reliability of the identification result on the basis of the failure component identified again.

4. The maintenance device according to claim 3, wherein the determination condition formula includes at least one of the following conditions:
   that a number of times that the alarm has been issued exceeds a first predetermined value,
   that a number of times that the apparatus has been restarted exceeds a second predetermined value, and that a number of times that the identification result obtained by the failure component identification unit has coincided exceeds a third predetermined value.

5. The maintenance device according to claim 3, wherein the measures to enhance the reliability of the identification result are an operation performed on the apparatus in order to satisfy the determination condition formula.

6. A presentation system comprising:
an apparatus constituting a maintenance target; and
a maintenance device maintaining the apparatus, the maintenance device including:
a failure component identification unit that collects an alarm issued when a measurement value, which is obtained by a measurement unit installed in the apparatus, the measuring unit measuring a condition of a component constituting the apparatus, exceeds a range of a measurement threshold value upon the component being out of order and that collects the measurement value transmitted with the alarm from the apparatus, the failure component identification unit identifying the failure component on the basis of the measurement value exhibiting a condition indicating a peculiarity of the failure after the failure of the component;
an identification reliability determination unit that determines the reliability of the failure component identification result obtained by the failure component identification unit; and
a first presentation unit that, when it is determined by the identification reliability determination unit that the reliability of the identification result is low, presents measures to enhance the reliability of the identification result until the measurement value exhibits a condition indicating the peculiarity of the failure,
wherein when the reliability of the identification result is determined to be low, the identification reliability determination unit transmits measures to enhance the reliability of the identification result presented by the apparatus to the apparatus, and causes the apparatus to present measures to enhance the reliability of the identification result, and the apparatus including:
an abnormality detection unit that issues the alarm when the measurement value measured by the measurement unit exceeds the range of the measurement threshold value;
an apparatus control unit that controls the operation of the component and that performs control to transmit the measurement value and the alarm to the maintenance device and to receive measures to enhance the reliability of the identification result from the maintenance device; and
a second presentation unit that presents measures to enhance the reliability of the identification result received by the apparatus control unit from the maintenance device.

7. A non-transitory computer readable medium with an executable program stored thereon to cause a computer to execute the procedures of:
collecting an alarm issued when a measurement value, which is obtained by a measurement unit installed in an apparatus being a maintenance target, the measuring unit measuring a condition of a component constituting the apparatus, exceeds a range of a measurement threshold value upon the component being out of order, collecting the measurement value transmitted with the alarm from the apparatus, and identifying the failure component on the basis of the measurement value exhibiting a condition indicating a peculiarity of the failure after the failure of the component;
determining a reliability of the failure component identification result; and
presenting measures to enhance the reliability of the identification result until the measurement value exhibits a condition indicating the peculiarity of the failure when it is determined that the reliability of the identification result is low, and
when the reliability of the identification result is determined to be low, transmit measures to enhance the reliability of the identification result presented by the apparatus to the apparatus, and cause the apparatus to present measures to enhance the reliability of the identification result.

* * * * *